S. W. FINCH.
TOY BLOCK.
APPLICATION FILED JAN. 28, 1915.
1,201,710.
Patented Oct. 17, 1916.
3 SHEETS—SHEET 1.
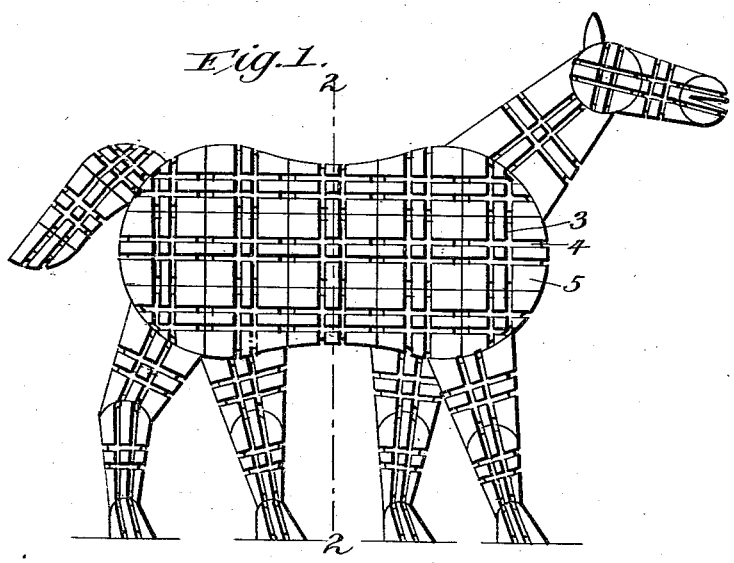
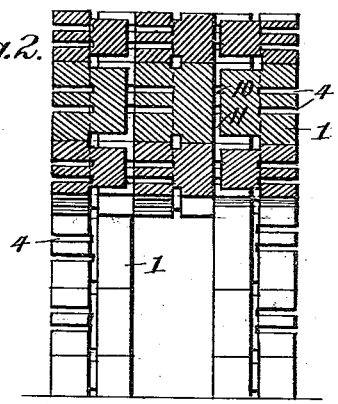
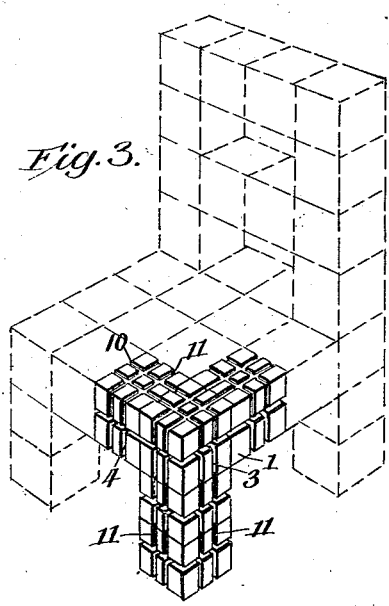
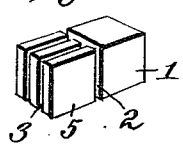
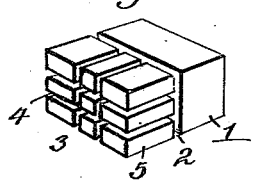
Inventor
Stanley W. Finch,
By Dodge and Sons,
Attorneys
Witnesses S. W. FINCH.
TOY BLOCK.
APPLICATION FILED JAN. 28, 1915.
1,201,710.
Patented Oct. 17, 1916.
3 SHEETS—SHEET 2.
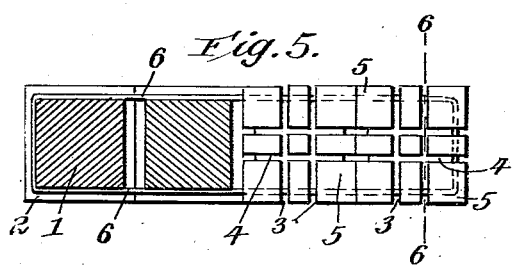
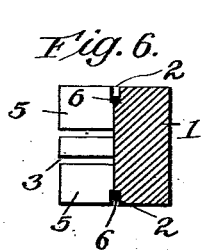
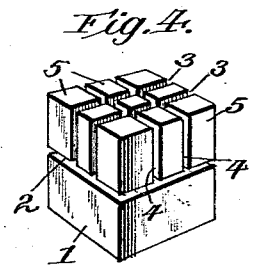
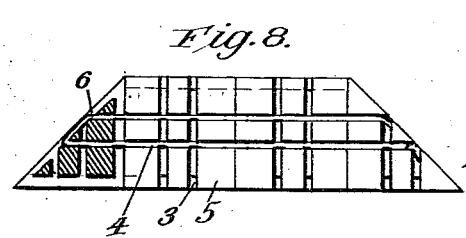
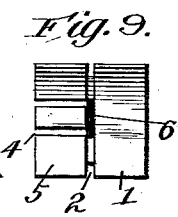
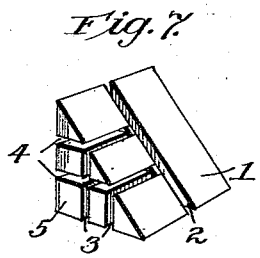
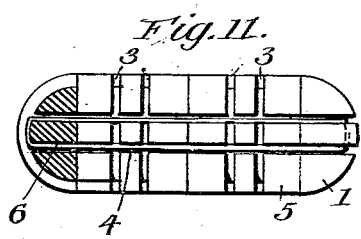
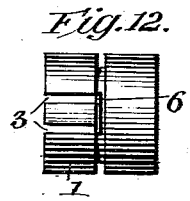
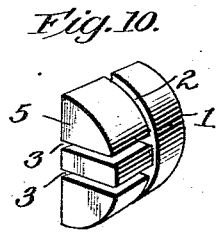
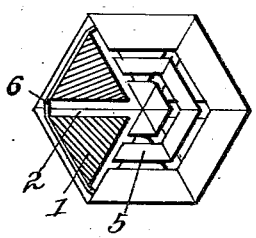
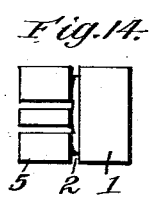
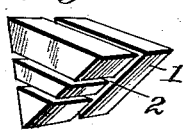
Inventor
Stanley W. Finch,
By Dodge and Sons,
Attorneys
Witnesses S. W. FINCH.
TOY BLOCK.
APPLICATION FILED JAN. 28, 1915.
1,201,710.
Patented Oct. 17, 1916.
3 SHEETS—SHEET 3.
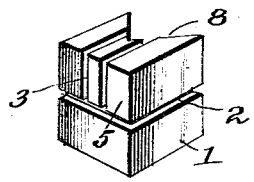
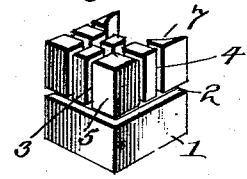
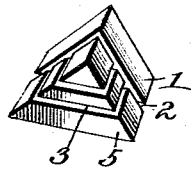
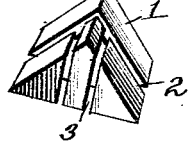
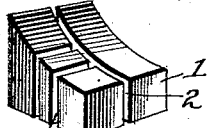
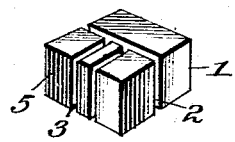
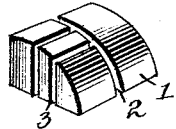
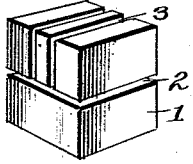
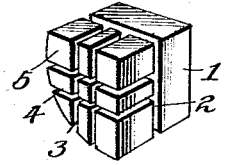
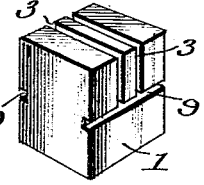
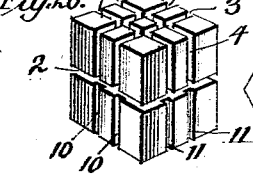
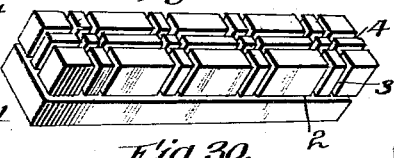
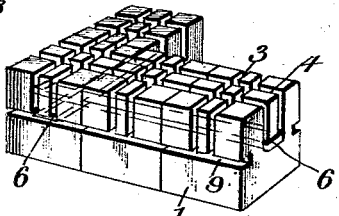
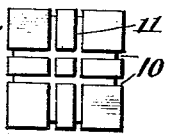
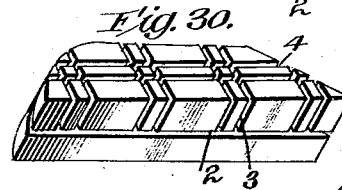
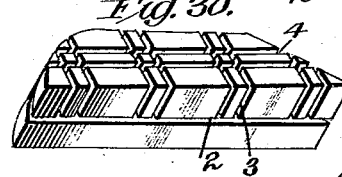
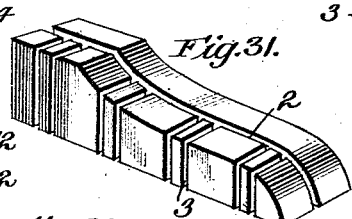
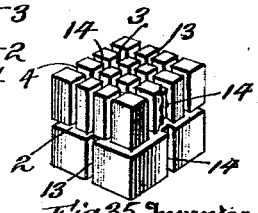
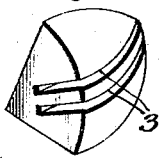
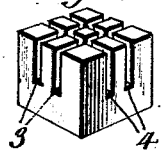
Inventor
Stanley W. Finch,

UNITED STATES PATENT OFFICE.

STANLEY W. FINCH, OF LINTHICUM, MARYLAND.

TOY BLOCK.

1,201,710.  Specification of Letters Patent.  Patented Oct. 17, 1916.

Application filed January 28, 1915. Serial No. 4,864.

*To all whom it may concern:*

Be it known that I, STANLEY W. FINCH, a citizen of the United States, residing at Linthicum, in the county of Anne Arundel and State of Maryland, have invented certain new and useful Improvements in Toy Blocks, of which the following is a specification.

My present invention pertains to improved toy blocks, adapted more particularly for the construction or building-up of various figures or structures by the use of suitable retaining means, preferably elastic bands, which serve to maintain the blocks in their desired correlated positions.

The present construction may be said to be an improvement upon that disclosed in Letters Patent granted to me under date of May 3, 1910, No. 956,632, and the main object of the present invention is to so construct the blocks that they may be more readily assembled, and a greater range of ultimate shapes or figures may be produced than under said patented construction. So, too, the rubber bands (or other fastening means, such as a string or spring) which are employed to secure the parts in place will, with the present construction, be less in evidence, particularly in an elaborate built-up structure than is the case under the patented form or forms.

The invention is illustrated in the annexed drawings, wherein:

Figure 1 is a side elevation of a horse composed of or formed from blocks made in accordance with the present invention; Fig. 2 is a vertical transverse sectional view, on the line 2—2 of Fig. 1; Fig. 3 is a perspective view of a chair; Fig. 4 a like view of a cubical block embodying the underlying principle of the invention; Fig. 5 a sectional elevation of four of such blocks secured together by a band; Fig. 6 a sectional view on the line 6—6 of Fig. 5; Fig. 7 a perspective view of a triangular block; Fig. 8 a sectional elevation showing two such blocks connected to two intermediate cubes; Fig. 9 an end elevation thereof; Fig. 10 a perspective view of a half-cylindrical block; Fig. 11 a sectional elevation of two of such blocks assembled with two cubical blocks; Fig. 12 an end elevation of Fig. 11; Fig. 13 a sectional elevation of a hexagonal form composed of six blocks; Fig. 14 a side elevation of one of the blocks illustrated in Fig. 13; Fig. 15 a perspective view thereof; Fig. 16 a similar view of a like block of different angularity; Figs. 17 and 18 perspective views showing blocks each having a recessed or depressed face; Fig. 19 a view showing a triangular block with the cross slots arranged at right angles to those in Fig. 16; Fig. 20 a perspective view of a block having a curved face; Fig. 21 illustrates a half cube or block; Fig. 22 a half block having a curved face;
Fig. 23 a cubical block having two cross slots only; Fig. 24 a quarter-round block; Fig. 25 a cubical block having but two cross slots and the encircling or side groove interrupted so that it appears upon two sides only of the block; Fig. 26 a perspective view of a still further modification of the invention, showing the cross slots extended as grooves down along the sides of the block; Fig. 27 a bottom plan view thereof; Fig. 28 illustrates a block similar to that shown in Fig. 26, but comprising two units, or being double the length of that shown in Fig. 26; Fig. 29 a perspective view of an oblong four-unit block; Fig. 30 a similar view of a like block having ends of different forms; Fig. 31 a block of four-units length, one unit appearing in full cube form while one side of the three remaining units is fashioned into an ogee curve; Fig. 32 a perspective view of a block having the form of an eighth of a sphere; Fig. 33 a view showing assembled a series of blocks of a still further modified form; Fig. 34 a quarter cylindrical block; Fig. 35 a cubical block having three cross slots instead of two, running across the block at right angles to each other; Fig. 36 a perspective view of a further modification; Fig. 37 a similar view of a still further modification; Fig. 38 a perspective view of a quarter-section block; and Fig. 39 a like view of a half-unit block of modified form.

In the drawings, referring first to Figs. 4, 5 and 6, 1 denotes the body of the block, which in this instance is cubical in form and may be said to be the unit of construction. The block is provided with a continuous groove 2, which passes around four sides of the same, at its middle, and with two pairs of intersecting slots, said slots being denoted by 3, 3 and 4, 4 which are cut down half way through the block and connect with the groove 2. The slots of each pair are preferably parallel and each pair of slots crosses the other pair at right angles, the individual slots lying, by preference, slightly nearer the center of the block than to the edge thereof. There is thus produced a block having a solid base lying below the groove 2 and a series of upwardly-extending posts, denoted by 5, defined or produced by the intersecting slots 3 and 4. Said slots and the groove 2 are of such width as to admit of the ready entrance of a rubber band 6, particularly when it is stressed and consequently temporarily thinned, which band is employed to hold the blocks together, as shown in Fig. 5, the band in this instance being placed in the grooves 2 of the four alined blocks. For the sake of clearness and in order to avoid needless repetition, the groove 2 and the slots 3, 3 and 4, 4 are similarly lettered in all the views. Where but a single pair of slots appears they will be designated by 3, 3.

In Figs. 8 and 9, wherein the end blocks are shown as triangular, and of the form disclosed in Fig. 7, the band is shown as positioned in the cross slots 4, 4, the end or looped portion of the band lying in the groove 2, upon the inclined face of the end blocks.

In Figs. 11 and 12 a similar arrangement is disclosed, the end blocks being half-round, as in Fig. 10, and being provided with but a single pair of parallel slots 3, 3.

In Figs. 14 and 15 a block having the form of an equilateral triangle is disclosed, and in Fig. 13 six of said blocks are arranged in the form of a hexagon, held by a band 6.

In Fig. 16 a right-angled triangular block is disclosed, having two cross slots 3, arranged parallel to each other and to the base of the block.

Fig. 17 discloses a block having a rounded seat or depression 7 in one face thereof, and Fig. 18 shows a like block, with a V-shaped depression 8 therein, and with but a single pair of slots, 3, 3.

Fig. 19 discloses a right-angled triangular block with a single pair of slots, the slots in this instance extending toward the apex or at right angles to the base of the triangle, instead of parallel thereto, as in Fig. 16.

In Fig. 20 the upper face of the block is curved, the curve extending from a full-unit height at one end to a half-unit dimension at the other.

Fig. 21 discloses a half-unit block with but a single pair of cross slots 3, 3.

The half-unit block disclosed in Fig. 22 has one face rounded.

In Fig. 23 a cubical unit block is disclosed, in which but a single pair of cross-slots is produced.

Fig. 24 shows a unit block having a quarter-round form, while in Fig. 25 a unit block is shown having a single pair of slots 3, 3 and a pair of grooves 9, arranged upon opposite side faces of the block and into which the slots extend.

In Figs. 26 and 27 the block in addition to having the cross slots 3, 3 and 4, 4 and the encircling groove 2, also has shallow grooves 10, 10 and 11, 11, upon the lower portion thereof, upon each side and the bottom, the grooves standing in line with the slots 3, 3 and 4, 4 respectively.

Fig. 28 discloses a double-unit block, each end being formed with cross slots 3, 3 and 4, 4 and with shallow alining grooves 12 upon the sides of the block between the circumferential grooves 2, 2.

A solid, four-unit oblong block is disclosed in Fig. 29, while a similar block is disclosed in Fig. 30, one end, however, being curved while the other is straight and inclined.

A solid, four-unit block is disclosed in Fig. 31, three quarters of one side thereof presenting an ogee curve.

Fig. 33 discloses a plurality of blocks in an assembled condition, two bands 6 being shown extending at right angles to each other, and the blocks having side grooves 9 only.

The block shown in Fig. 34 is of the quarter-round type having two cross slots 3, 3 and a centrally-disposed encompassing groove 2.

In Fig. 35 a still further modification is illustrated, in which, in addition to the two series of cross slots 3, 3 and 4, 4 and the groove 2, the block is provided with grooves 13 and 14, which cross groove 2 at right angles, and pass entirely around the block at right angles to each other and intermediate the slots 3, 3 and 4, 4 respectively. The groove 13 in the upper part of the block is made of the full depth of the slots.

In Fig. 36 there is shown a block provided with a single pair of parallel slots 3, 3 extending inwardly from one face of the block to substantially the center thereof, and in Fig. 37 a block is disclosed wherein there are two sets or pairs of slots 3, 3 and 4, 4 extending from one face of the block and crossing at right angles, said slots likewise extending inwardly to approximately the center of the block.

In Fig. 38 a quarter-unit block is shown, having a single pair of cross slots 3.

In Fig. 39 a half-nut block is disclosed, said block having cross-slots 3 and 4, the construction being similar to that illustrated in Fig. 1, with the addition of the slots 4.

It will be appreciated that blocks of other shapes may be readily formed, which will include my invention and some of them appear in Figs. 1 and 2, wherein the figure of a horse is disclosed. The bands are omitted from these views for the sake of clearness, but it may be said that the body in transverse thickness is composed of three series of blocks (see Fig. 2) which are readily connected to each other by slipping the bands downwardly into the cross slots 3, 3 or 4, 4 as the case may be; and the legs are similarly built up and attached in pairs, respectively to the outside series of body blocks. The head and tail are attached to the central series of blocks, and said members and legs may be brought to any desired position in line with the body by reason of the flexible connection and the fact that the contacting faces of the body and members are curved upon the same radius.

In Fig. 3 the adaptability of the block to the building up of a chair is clearly indicated.

By the use of the slots 3, 3 and 4, 4, extending down half-way through the block and into the grooves 2, 9, 10 or 11, one may readily position a rubber band, which will be substantially inclosed. So, too, one may slip a band into the alined slots of two blocks and then by merely pulling said blocks apart engage one or more blocks by the tensioned band, the band readily slipping down into the corresponding slots and all the blocks being held when the pulling action on the end blocks is released. This will be clearly evident upon reference more particularly to Figs. 8, 11 and 33.

In Fig. 5 the blocks are shown as held together by the band 6, placed in the groove 2, the slots 3, 3 and 4, 4 of the various blocks being left entirely free for the reception of other bands by which laterally-positioned blocks may be secured in place.

It is found in actual use that the cross-slots arranged in pairs renders the building up of structures much more simple and allows a latitude which does not obtain under my patented construction above referred to. So, too, fewer bands are required in the building-up of any particular form than with the old style of blocks, and with a single band a corner may be turned, whereas under the patented structure several bands were required. The blocks may be more easily and quickly assembled, since it is unnecessary to insert the bands between the blocks, the bands passing down directly into the slots in the blocks and being anchored by the end posts formed by the adjacent parallel slots. Again, a plurality of grooves serves as ornamentation and also renders any surface defects in the wood obscure, doing away with the necessity of painting or dyeing the blocks. Furthermore, the present form of blocks permits the use of those having depressed faces, as illustrated in Figs. 17, 18, 20 and 31, and renders the bands invisible when the parts are assembled.

Upon reference to Fig. 33 it will be seen that the band 6 stands out where it may be readily grasped, and further elongated, preparatory to engage another block; and the same advantage obtains under the constructions disclosed in Figs. 25, 32, 33, 36 and 37. Furthermore, the block disclosed in Fig. 36 is especially adapted as a filler or intermediate block, and is, of course, cheaper to manufacture than the other form.

Having thus described my invention, what I claim is:

1. As a new article of manufacture, a toy building-block having a plurality of parallel slots formed across and extending inwardly from one face thereof and merging at their ends into a groove formed upon those faces of the block where the ends of the slots appear.

2. As a new article of manufacture, a toy building-block having a plurality of parallel slots formed across one face thereof and extending inwardly therefrom, said block also having a groove extending around the same and merging into the lower end portions of the slots.

3. As a new article of manufacture, a toy building-block having a plurality of pairs of slots extending across one face thereof and inwardly to approximately the mid-depth of the block, the slots of one pair being arranged at right angles to those of the other.

4. As a new article of manufacture, a toy building-block having a plurality of pairs of slots extending across one face thereof and inwardly to approximately the mid-depth of the block, the slots of one pair being arranged at right angles to those of the other, the block likewise having a groove extending around the same at right angles to the slots and merging with the lower portions thereof.

5. As a new article of manufacture, a toy building-block having a plurality of pairs of slots extending across one face thereof and inwardly to approximately the mid-depth of the block, the slots of one pair being arranged at right angles to those of the other, the block likewise having a groove extending around the same at right angles to the slots and merging with the lower portions thereof and also having a second groove extending about the block at right angles to the last-mentioned groove, said second groove extending between the slots which run in the same direction therewith.

6. As a new article of manufacture, a toy building-block having a groove adjacent the center thereof, and likewise having cross slots formed in the block to one side of the groove and merging into the same, the body of the block, upon the opposite side of the groove, presenting plane unbroken surfaces.

7. As a new article of manufacture, a toy building-block having a groove adjacent its medial portion and likewise having two pairs of intersecting slots extending from one face of the block inwardly to the mid-depth thereof, said slots merging at their ends into the groove, the body of the block, upon the opposite side of the groove, presenting plane unbroken surfaces.

8. A toy building-block, having a plurality of parallel slots which enter from one face thereof and extend substantially to the mid-depth thereof, the opposite face of the block being unbroken.

9. As a new article of manufacture, a toy building-block having a plurality of pairs of slots extending across one face thereof and inwardly to approximately the center of the block, the slots of one pair being arranged at an angle to those of the other, the block likewise having a groove at an angle to the slots and merging with the lower portion thereof.

10. As a new article of manufacture, a toy building-block, having a plurality of pairs of slots extending across one face thereof and inwardly to approximately the mid-depth of the block, the slots of one pair being arranged at an angle to those of the other.

In testimony whereof I have signed my name to this specification in the presence of two subscribing witnesses.

STANLEY W. FINCH.

Witnesses:
  HORACE A. DODGE,
  BENNETT S. JONES.